Figure 1:
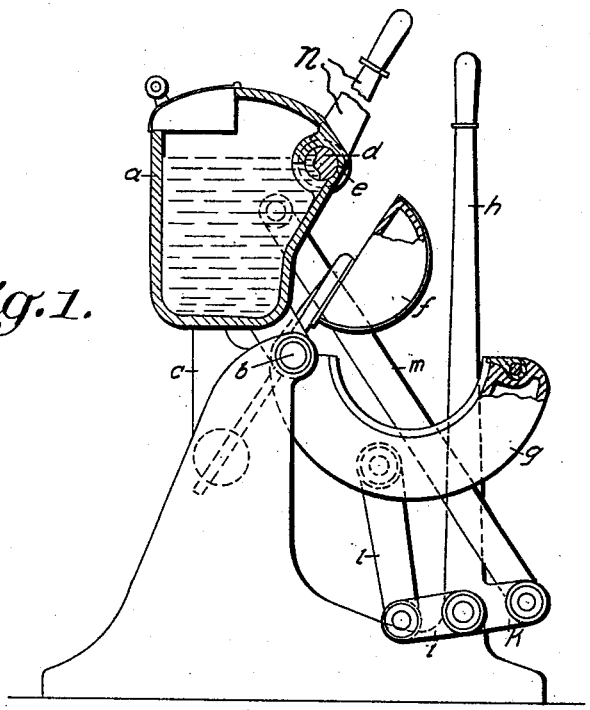

Feb. 14, 1933.  K. SCHÄFLEIN  1,897,823
CASTING APPARATUS FOR STEREOTYPE PLATES HAVING A MOLD ADAPTED
TO BE PRESSED IMMEDIATELY AGAINST THE MELTING POT
Filed Sept. 17, 1931

Inventor:
Karl Schäflein
By: Powell
Atty.

Patented Feb. 14, 1933

1,897,823

UNITED STATES PATENT OFFICE

KARL SCHÄFLEIN, OF BERN, SWITZERLAND

CASTING APPARATUS FOR STEREOTYPE PLATES HAVING A MOLD ADAPTED TO BE PRESSED IMMEDIATELY AGAINST THE MELTING POT

Application filed September 17, 1931, Serial No. 563,326, and in Germany September 29, 1930.

In smaller stereotyping plants the molten metal is poured into the closed mold by hand with the assistance of a scoop or trough. This work, however, takes time, and it has the drawback that the plates must be cast with a large riser, which, afterwards, must be removed by a saw, or by breaking off.

The invention relates to a casting device, also useful for smaller concerns, and in which the plates can be cast without a riser, as in the large automatic casting machines. In this casting device the mold adjoins the melting pot immediately in the casting position, in known manner. The new feature consists in the fact that the mold and the melting pot are moved simultaneously toward each other by a system of links, and the overflow of the metal out of the tilted pot into the mold is controlled by means of a metal closing organ provided on the melting pot.

The melting pot can be provided with electric heating, so that a furnace is not necessary, and the entire device can be produced at a price which makes it suitable for smaller concerns.

On the drawing the casting device is shown diagrammatically by way of example,

Fig. 1 showing the pot and mold in the position of rest, and

Figure 2:
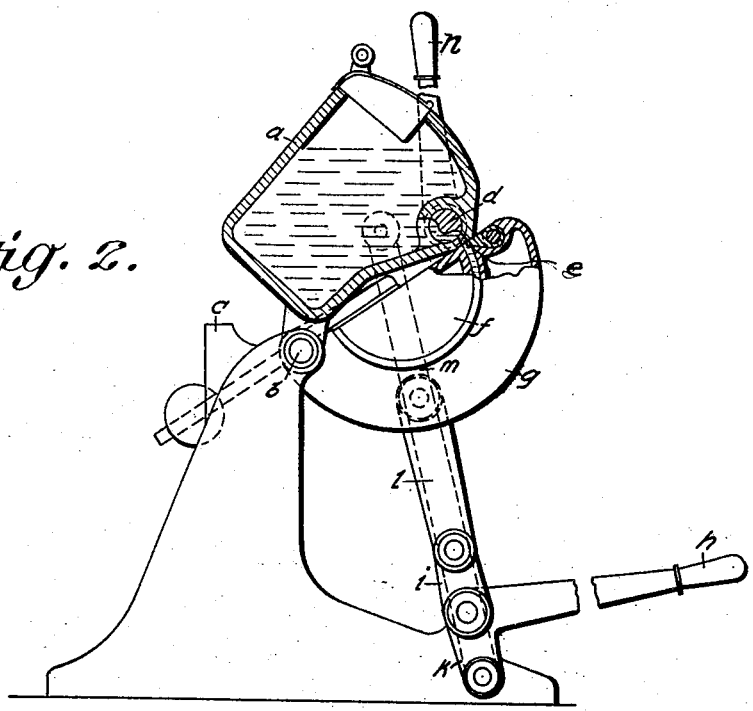

Fig. 2, the same parts in the casting position.

The melting pot $a$ which is heated electrically, in known manner, and can be insulated on the outside, is pivoted at the front, at $b$, and rests, at the back, on a stop $c$ on the frame. At a suitable point in the pot $a$ the cock $d$ is provided, which controls the outlet $e$. On the same pins $b$ are pivoted the core $f$ and shell $g$.

For lifting the shell $g$ and for tilting the pot $a$ forward, the three-armed lever $h$, $i$, $k$ is used, whose arm $i$ is jointed by the link $l$ to the mold $g$, and whose arm $k$ is jointed by the link $m$ to the pot $a$.

By turning the lever $h$ forward the pot $a$ is pulled down by the link $m$ toward the core $f$, and takes this core along downward until the latter bears against the shell $g$ raised by the link $l$, and forms, together with this shell, the closed mold (Fig. 2). Thereupon the cock $d$ is opened by means of the lever $n$, and, by so doing, the stereotype plate is cast.

As soon as the plate is sufficiently solid the cock $d$ is closed again, and the shell $g$ and pot $a$ are brought back into the position shown in Fig. 1 by means of the lever $h$, whereupon the plate is removed out of the mold.

What I claim and desire to secure by Letters Patent of the United States is:—

1. In a casting apparatus for stereotype plates, the combination of a melting pot adapted to be tilted downward about an axis located beneath said pot, a mold arranged to be swung upward about said axis, and operating means for tilting said pot and simultaneously swinging said mold upward into cooperative relationship with said pot.

2. In a casting apparatus for stereotype plates, the combination of a melting pot adapted to be tilted downward about an axis located beneath said pot, a mold arranged to be swung upward about said axis, a valve in said pot, operating means for said valve, and operating means for tilting said pot and simultaneously swinging said mold upward into cooperative relationship with said pot.

3. In a casting apparatus for stereotype plates, the combination of a melting pot adapted to be tilted downward about an axis located beneath said pot, a mold arranged to be swung upward about said axis, and a manually operated toggle lever system for tilting said pot and simultaneously swinging said mold upward into cooperative relationship with said pot.

4. In a casting apparatus for stereotype plates, the combination of a melting pot adapted to be tilted downward about an axis located beneath said pot, a mold arranged to be swung upward about said axis, a valve in said pot, operating means mounted on said pot for opening and closing said valve, and manually actuated means for tilting said pot and simultaneously swinging said mold upward to thereby bring said pot and valve into cooperative relationship with said mold.

5. In a casting apparatus for stereotype plates, the combination of a melting pot adapted to be tilted downward about an axis located beneath said pot, a mold arranged to be swung upward about said axis, a valve in said pot, operating means mounted on said pot for opening and closing said valve, and self-locking manually actuated means for tilting said pot and simultaneously swinging said mold upward to thereby bring said pot and valve into cooperative relationship with said mold.

In testimony thereof I have signed my name to this specification.

KARL SCHÄFLEIN.